US011460377B2

(12) United States Patent
Farris et al.

(10) Patent No.: US 11,460,377 B2
(45) Date of Patent: Oct. 4, 2022

(54) DEVICE FOR MICROSCOPIC SAMPLE COLLECTION

(71) Applicant: The Mitre Corporation, McLean, VA (US)

(72) Inventors: Michael Heath Farris, Vienna, VA (US); Kevin Robert Gemp, Falls Church, VA (US); David Masters, Great Falls, VA (US)

(73) Assignee: THE MITRE CORPORATION, McLean, VA (US)

( * ) Notice: Subject to any disclaimer, the term of this patent is extended or adjusted under 35 U.S.C. 154(b) by 176 days.

(21) Appl. No.: 16/821,335

(22) Filed: Mar. 17, 2020

(65) Prior Publication Data

US 2020/0217757 A1 Jul. 9, 2020

Related U.S. Application Data

(63) Continuation of application No. 14/973,083, filed on Dec. 17, 2015, now Pat. No. 10,634,584.

(51) Int. Cl.
*G01N 1/02* (2006.01)
*G01N 1/28* (2006.01)

(52) U.S. Cl.
CPC ............ *G01N 1/02* (2013.01); *G01N 1/2813* (2013.01); *G01N 2001/028* (2013.01); *G01N 2001/2833* (2013.01)

(58) Field of Classification Search
CPC .. G01N 1/02; G01N 1/2813; G01N 2001/028; G01N 2001/2833

USPC ...................................................... 435/309.1
See application file for complete search history.

(56) References Cited

U.S. PATENT DOCUMENTS

| 4,834,946 | A | * | 5/1989 | Levin | G01N 33/5302 |
| | | | | | 422/527 |
| 5,098,663 | A | * | 3/1992 | Berthold | B01L 9/06 |
| | | | | | 422/561 |
| 6,451,262 | B1 | * | 9/2002 | Chiodo | G01N 1/06 |
| | | | | | 422/536 |
| 2013/0237137 | A1 | * | 9/2013 | Huff | A47G 21/14 |
| | | | | | 451/552 |

FOREIGN PATENT DOCUMENTS

AU 9716606 * 10/1997

* cited by examiner

*Primary Examiner* — Benjamin R Whatley
*Assistant Examiner* — Jacqueline Brazin
(74) *Attorney, Agent, or Firm* — Sterne, Kessler, Goldstein & Fox P.L.L.C.

(57) ABSTRACT

Various embodiments directed to a work stand for holding a microscopic collection device for collecting a microscopic sample from a target surface, are provided. The work stand includes a first slit formed on a top surface of the work stand and capable of holding a first microscopic collection device comprising a first holding element and a first collection platform, wherein the first collection platform of the first microscopic collection device is perpendicular to the top surface. A second slit formed on the top surface of the work stand and capable of holding a second microscopic collection device comprising a second collection platform and a second holding element at an angle to the second collection platform perpendicular to the top surface of the work stand.

20 Claims, 14 Drawing Sheets

DEVICE FOR MICROSCOPIC SAMPLE COLLECTION

CROSS-REFERENCE TO RELATED APPLICATION

This application is a continuation of and claims priority to non-provisional patent application Ser. No. 14/973,083, titled "Device for Microscopic Sample Collection" to Farris et al, filed Dec. 17, 2015, which is herein incorporated by reference in its entirety.

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. HSHQDC-14-D-00006 and Task Order(s) HSHQDC-15-J-00068 awarded by the Department of Homeland Security, Science, and Technology Directorate.

FIELD

The embodiments relate generally to microscopic sample collection devices, and more particularly to microscopic sample collection devices that use a tape-lift method.

BACKGROUND

Collecting trace amounts of microscopic samples, such as DNA, from sample surfaces of interest poses a number of challenges. The surface materials vary in composition which may facilitate or inhibit microscopic sample collection. And, trace microscopic samples may be distributed unevenly across the surface plane in sub-nanogram quantities. The conventional tape-lift methods for collecting trace microscopic samples use water soluble tape that is wrapped around closed forceps. Once wrapped, an operator rubs the tape against a surface and collects the microscopic samples. However, using a piece of tape wrapped around forceps is inefficient. First, the tape does not come into contact evenly against the surface, and, as a result, does not efficiently collect trace amounts of microscopic samples. Second, the surface area of tape that is wrapped around forceps is small.

Other conventional techniques to recover trace amounts of microscopic samples, such as swabbing technique can also be used. But when microscopic samples are collected using a swabbing technique, extra liquid is added to a target surface or to a swab. The liquid increases probability of microscopic sample contamination and dilution. Also, the swab tends to push the microscopic sample across the target surface, rather than collect the microscopic sample.

Therefore, what is needed is a microscopic collection device for performing a tape-lift method that uses the least amount of tape to concentrate the most amount of trace microscopic sample.

Another challenge is microscopic sample contamination that may occur as a result of inadvertent tape contamination. Tap contamination may occur when an operator wraps and unwraps the tape around the forceps. Conventionally, there are two operators that wrap the tape around the forceps and may contaminate the tape in the process. The first operator holds the forceps, while the second operator wraps the tape around the forceps. To reduce inadvertent tape contamination, what is needed is a work stand that enables a single operator to attach tape to the microscopic collection device and minimize contamination.

BRIEF SUMMARY

Microscopic collection device and method embodiments for collecting a microscopic sample from a target surface, are provided. In an embodiment, the microscopic collection device includes a holding element comprising a handle at one end and a collection platform connected to the holding element at another end. The collection platform includes a collection surface on which the microscopic sample is deposited when the device comes into contact with the target surface, and a slit. A tape is inserted through the slit and wrapped around the collection platform.

A work stand for holding the microscopic collection device while the tape is attached to the microscopic collection device, is also provided. The work stand includes a slit capable of holding the microscopic collection device such that the collection platform is perpendicular to the top surface of the work stand.

Further features and advantages of embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings are incorporated herein and form a part of the specification, illustrate the embodiments and, together with the description, further serve to explain the principles of the embodiments and to enable a person skilled in the pertinent art to make and use the invention.

Figure 1:
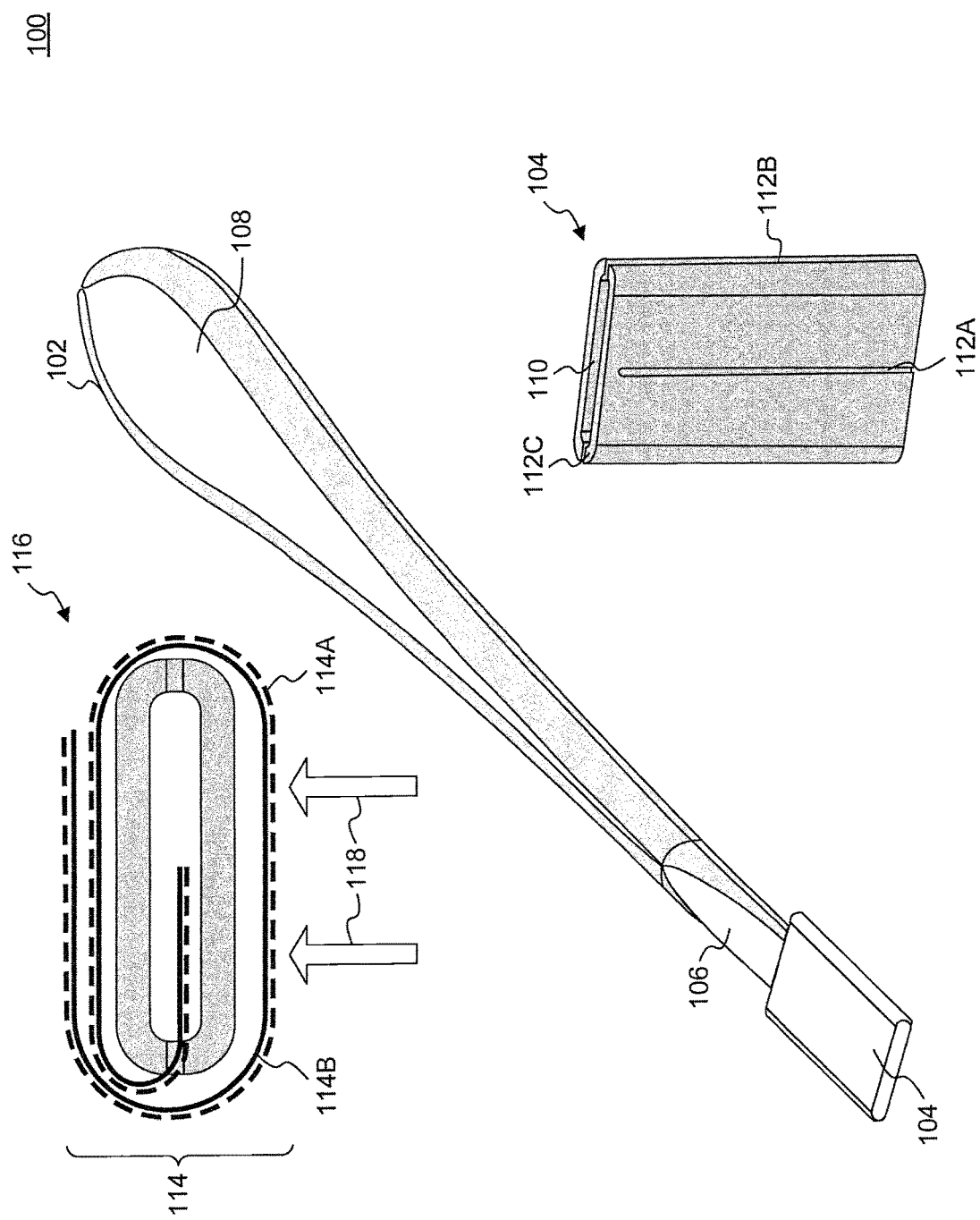
FIG. 1 is a block diagram of a microscopic collection device, according to an embodiment.

The features and advantages of the embodiments will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Provided herein are microscopic sample collection devices, and/or combinations and sub-combinations thereof, for collecting microscopic samples from a surface of interest or a target surface. The microscopic collection devices described herein address a number of challenges faced by operators, including field agents and laboratory technicians, during collection of trace amounts microscopic samples deposited on a target surface. In particular, the microscopic collection devices utilize a tape-lift method which includes tape attached to the microscopic collection device. The tape collects the trace amount of microscopic sample when in contact with the target surface. Unlike conventional microscopic collection devices, such as forceps that are wrapped with tape, microscopic collection devices described here are designed to use the least amount of tape to collect the most amount of trace microscopic sample from a target surface.

In an embodiment, the microscopic collection devices increase or even maximize the sample collection surface area. For example, the microscopic collection devices include a flat surface area for mounting tape. The increased collection surface area results in the increased amounts of trace microscopic samples collected from the target surface.

In an embodiment, the microscopic collection devices also reduce the amount of tape required for sample collection and subsequent processing. For example, microscopic collection devices collect a microscopic sample using a single layer of the tape. The single layer of tape is removed from the microscopic collection device for extraction. The tape is removed in a way, such that, the tape does not contain excess tape to disrupt the extraction process. During the extraction process, a tape that includes a microscopic sample, such as DNA, is placed in a reaction tube that includes chemicals for breaking down the cell walls and extracting the DNA from the cells. These chemicals also dissolve the tape that includes the microscopic sample. However, the dissolved tape may leave residue in the reaction tube, and the residue may inhibit the recovery of the highest yields of DNA. Because the microscopic collection devices described herein limit the excess tape, the microscopic collection devices also limit the excess residue that may interfere with DNA collection.

In another embodiment, the microscopic collection devices reduce opportunity for operator contamination. As described below, the microscopic collection devices may include a handle and a collection platform. In an embodiment, the handle may be parallel to a collection platform or is at angle, such as, a 30° angle to the collection platform. These different embodiments allow an operator to access different types of target surfaces and also allow the operator to maintain distance from the target surfaces, and limit inadvertent interaction that may occur between the microscopic collection devices' and the target surfaces during the microscopic collection process. For example, microscopic collection devices that include a handle that is parallel to a collection platform may be used to access target surfaces that are between other objects, such as, for example, shelves in a book case or floor under a couch. In another example, microscopic collection devices that include a handle that is at an angle to the collection platform may be used to access target surfaces that are open surfaces, such as tables, or a surfaces of objects on top of tables.

In another embodiment, a work stand that holds microscopic collection device(s) when an operator attaches and detaches tape from the microscopic collection device(s) further prevents inadvertent contamination. For example, the work stand enables a single operator to attach and detach tape from the microscopic collection device(s), as opposed to conventional forceps that require two operators to attach and detach tape and thus increase risk of inadvertent contamination.

As described above, microscopic collection devices collect microscopic samples. Microscopic samples may be deposited on a target surface, when different objects come into contact with a target surface. During contact, trace microscopic samples of one object, such as a skin cells from a hand or a finger, are transferred to the target surface. Example microscopic samples may include, but are not limited to, isolated cells or parts of a cell that include nucleic acids. In a non-limiting embodiment, nucleic acid may include deoxyribonucleic acids ("DNA") and ribonucleic acids ("RNA") and all combinations or sub-combination thereof that are known to a person of ordinary skill in the art.

FIG. 1 is a block diagram of a microscopic collection device 100, according to an embodiment. Microscopic collection device 100 collects microscopic samples deposited on a surface of an object, also referred to as a target surface. Microscopic collection device 100 includes a holding element 102 and a collection platform 104 that may be detached from holding element 102. Collection platform 104 is also shown separately in FIG. 1.

In an embodiment, holding element 102 also includes a support platform 106 on the first end and a handhold 108 on the second end. Support platform 106 may be used to attach collection platform 104 to holding element 102. For example, support platform 106 may be positioned to fit inside collection platform 104 to facilitate microscopic sample collection. In a non-limiting embodiment, holding element (including support platform 106 and handhold 108) may be 147.0 mm in length. In a further embodiment, handhold 108 may be 14.3 mm in width. In yet a further embodiment, support platform may be 5.0 mm in width and may fit inside collection platform 104.

In an embodiment, an operator may use handhold 108 to hold and manipulate microscopic collection device 100 during microscopic sample collection. In a further embodiment, handhold 108 may be round, flat, shaped like a spatula, or have an ergonomic shape that facilitates operator's grip and adds balance to microscopic collection device 100.

In an embodiment, collection platform 104 may be a rectangular shaped platform, having long and short sides, and having a hollow center 110. In an embodiment, hollow center 110 of collection platform 104 may be suitable to include support platform 106 that may be positioned inside collection platform 104. Hollow center 110, may also be of a rectangular shape, such that the flat side of support platform 106 may be inserted into hollow center 110.

In a non-limiting embodiment, collection platform 104 may have length×width×height dimensions of 19 mm×10.5 mm×1.5 mm. In a further embodiment, the microscopic collection surface area of collection platform 104 that is used to collect microscopic samples from the target surface may be approximately 200 $mm^2$.

In an embodiment collection platform 104 may also have rounded sides.

In an embodiment, collection platform 104 may also include multiple slits 112A-C. Slits 112A-C may run along the length of collection platform 104 and may be positioned around the outside surface of collection platform 104 at predefined intervals. In one example, slit 112A may be positioned along the long and flat side of collection platform 104 that is parallel to and faces to and/or away from the target surface. In another example, slits 112B and 112C may be positioned along the surface of collection platform 104 that is perpendicular to the target surface.

In an embodiment, slits 112A-C hold tape 114 that is wrapped around collection platform 104. Tape 114 may be a microscopic collection tape, such as tape known to a person of ordinary skill in the art. Tape 114 may also be water soluble tape. An operator may insert one edge of tape 114 into slit 112B, such that one edge of tape 114 is inside hollow center 110. The operator may then wrap tape 114 around collection platform 104, as shown in a cross-section view 116.

Tape 114 may have an adhesive side 114A, shown by a dashed line in FIG. 1, and a non-adhesive side 114B, shown by a solid line in FIG. 1. In an embodiment, tape 114 may be wrapped around collection platform 104 such that the non-adhesive side 114B faces collection platform 104 and adhesive side 114A faces away from collection platform 104 and faces the target surface. In a further embodiment, arrows 118 show a microscopic sample collection side of collection platform 114 with tape 114 wrapped around collection platform 104.

Figure 2:
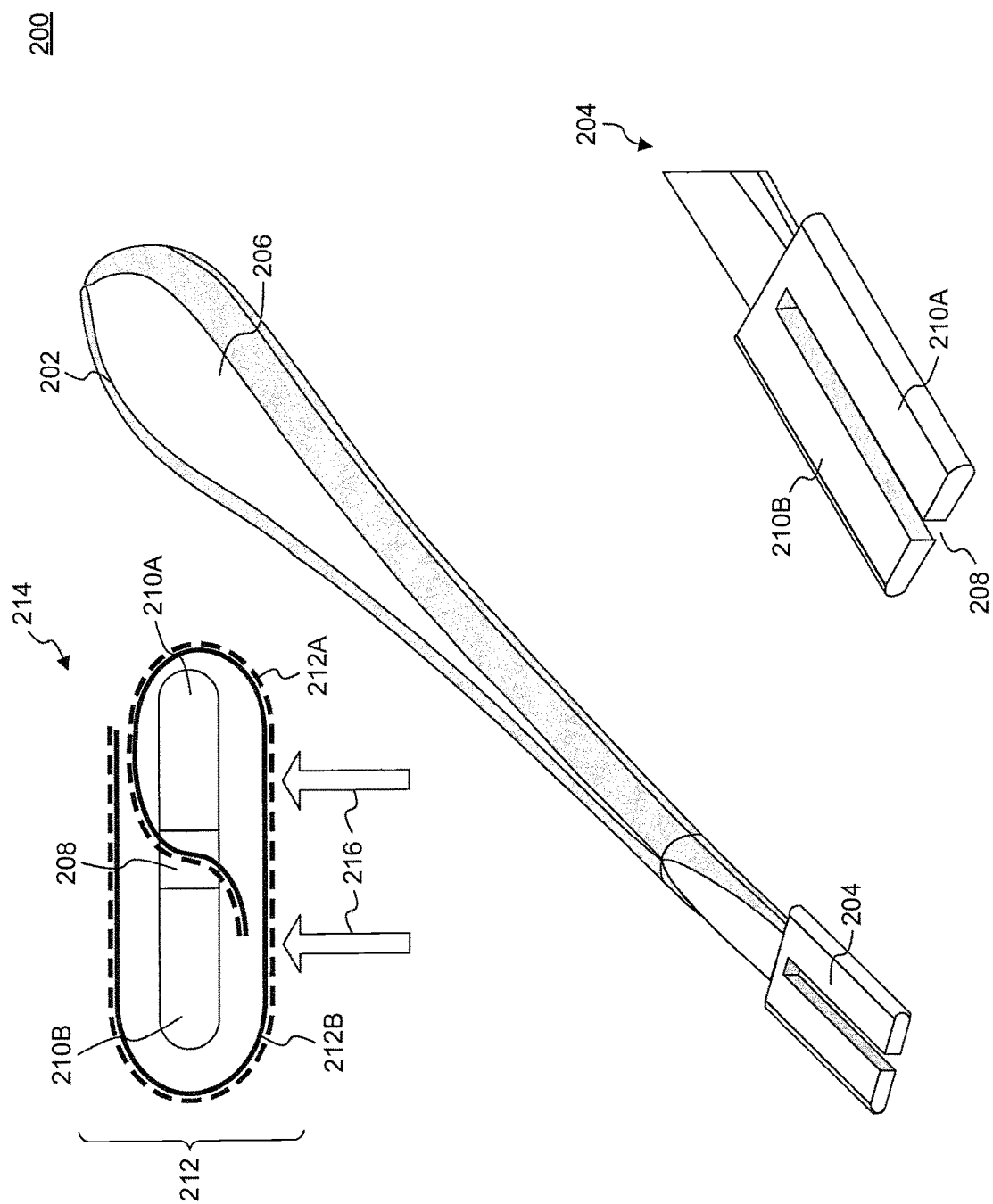
FIG. 2 is a block diagram of a microscopic collection device, according to an embodiment.

FIG. 2 is a block diagram of a microscopic collection device 200, according to an embodiment. Microscopic collection device 200 collects microscopic samples deposited on a target surface. Microscopic collection device 200 includes a holding element 202 and a collection platform 204. Holding element 202 and collection platform 204 may be fused together. In a further embodiment, microscopic collection device 200 may be 147 mm in length. The holding element may include a handhold 206 that facilitates an operator to hold and manipulate microscopic collection device 200 during microscopic collection. In a further embodiment, handhold 206 may be round, flat, shaped like a spatula, or have an ergonomic shape that facilitates operator's grip.

In a further embodiment, the center of gravity of microscopic collection tool 200 may be located in handhold 206. For this reason, handhold 206 may be wide and substantial in weight, while collection platform 204 may be sleek and slender, as shown in FIG. 2. Microscopic collection tool 200 having center of gravity located in handhold 206 allows collection platform 204 to rest on the target surface as the operator balances handhold 206 and operates microscopic collection tool 200, which further reduces a chance of incidental contamination.

In an embodiment, collection platform 204 may be of a rectangular shape and have length×width×height dimensions of 10 mm×19.5 mm×0.866 mm. Collection platform 204 is also shown separately in FIG. 2. In a further embodiment, collection platform 204 may include a slit 208 along the length and down the center of collection platform 204, such that collection platform 204 is divided into a first leg 210A and a second leg 210B. In an embodiment, first leg 210A and second leg 210B are approximately the same width. The length of slit 208 may be less than the length of collection platform 204, such that collection platform 204 is U shaped and comes together at the end connected to holding element 202. In an embodiment, the length of slit 208 may vary for different microscopic collection devices 200 such that tapes of different width may be inserted into collection platform 204.

In an embodiment, slit 208 holds tape 212 that is wrapped around collection platform 204, as shown in cross section view 214. For example, an operator may insert one edge of tape 212 into slit 208 beginning at the side of collection platform 204 that faces the target surface and wrap tape 212 around both leg 210A and leg 210B, such that tape 212 ends on the surface of collection platform 204 that faces away from the target surface.

In a further embodiment, tape 212 may be a microscopic collection tape such as that known to a person of ordinary skill in the art. Tape 212 may have an adhesive side 212A and a non-adhesive side 212B. In an embodiment, tape 212 may be wrapped around collection platform 204 such that the non-adhesive side 212B faces collection platform 204 and adhesive side 212A faces the target surface. In a further embodiment, arrows 216 show a microscopic sample collection side of collection platform 204 with tape 212 wrapped around collection platform 204.

Figure 3:
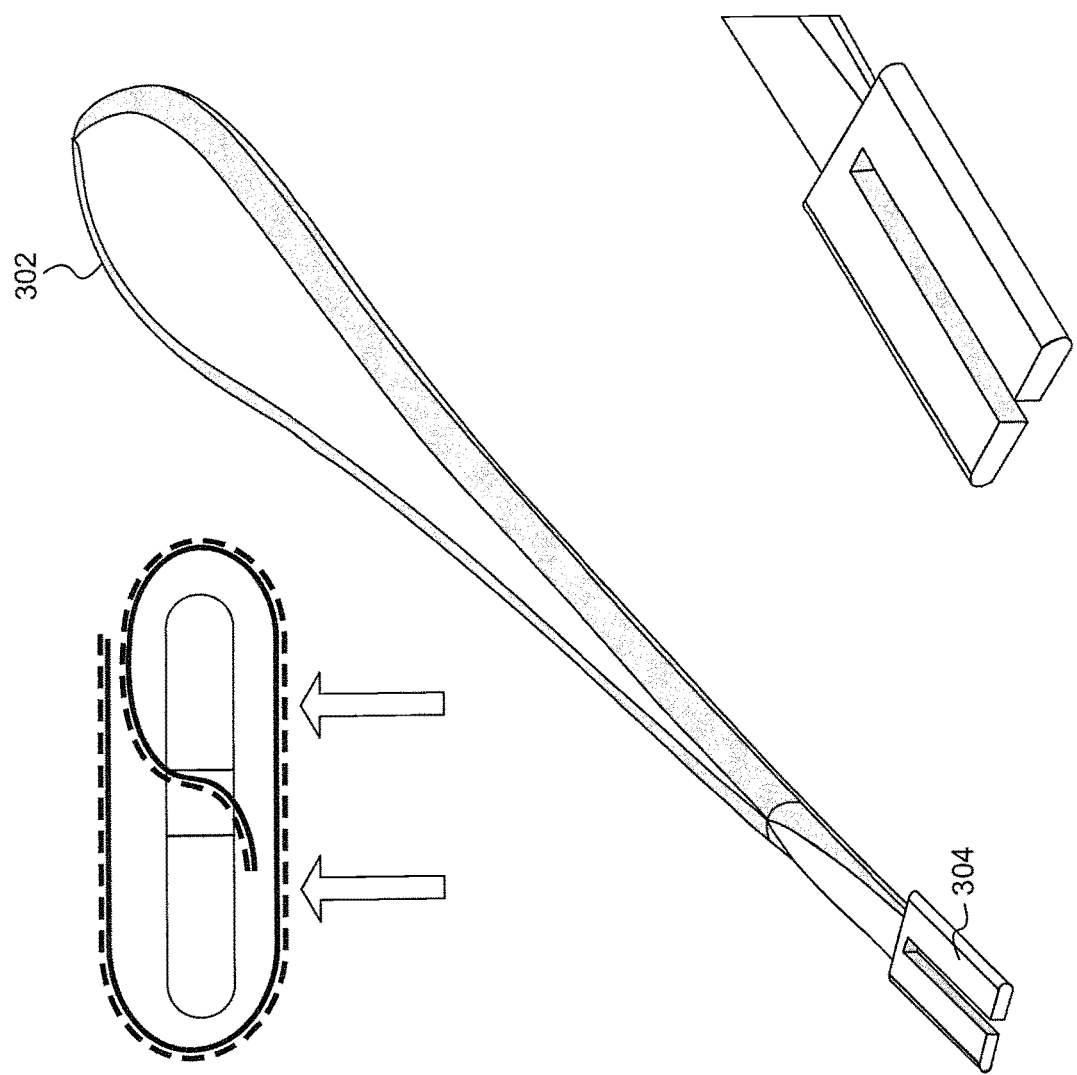
FIG. 3 is a block diagram of a microscopic collection device, according to an embodiment.

FIG. 3 is a block diagram of a microscopic collection device 300, according to an embodiment. Microscopic collection device 300 is similar to microscopic collection device 200, and has a holding element 302 and a collection platform 304. In addition, microscopic collection device 300 may be longer. For example, microscopic collection device 300 may have a longer holding element 302, such that microscopic collection device 300 has a length of 197.3 mm. The additional length of holding element 302 gives an operator of microscopic collection device 300 a more balanced feel. Also, the longer length separates the operator from the target surface and provides further safeguards against inadvertent sample contamination.

In another embodiment, collection platform 304 may be a rectangular shaped platform and have length×width×height dimensions of 10 mm×19.5 mm×0.866 mm. In a further embodiment, the surface area of collection platform 304 that comes into contact with the target surface is approximately 20.00 mm².

Figure 4:
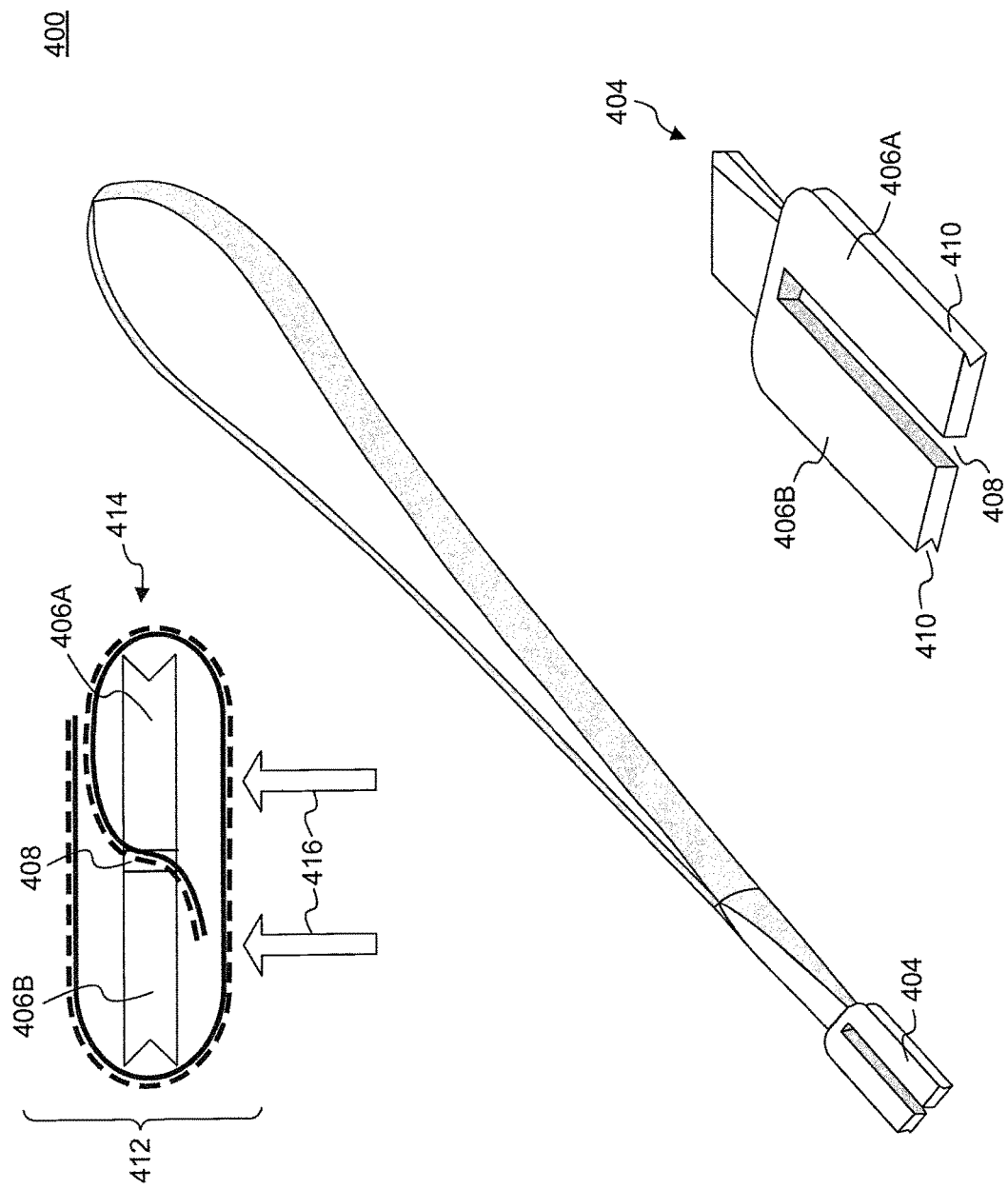
FIG. 4 is a block diagram of a microscopic collection device, according to an embodiment.

FIG. 4 is a block diagram of a microscopic collection device 400, according to an embodiment. Microscopic collection device 400 is similar to microscopic collection device 300, but has a different embodiment of a collection platform 404. Collection platform 404 is also shown separately in FIG. 4. Collection platform 404 reduces the amount of tape that is analyzed once an operator collects a microscopic sample.

In an embodiment, collection platform 404 may be a rectangular shaped platform and have length×width×height dimensions of 10 mm×19.5 mm×1.3 mm. In a further embodiment, the surface area of collection platform 404 that comes into contact with the target surface is approximately 20.00 mm².

In an embodiment, like collection platform 304, collection platform 404 may be divided into two legs, 406A and 406B by a slit 408, such that collection platform 404 is U shaped. Each of legs 406A-B also have groves 410 formed along the outside side of each leg 406A and 406B. Groves 410 are parallel to slit 408. In an embodiment, groves 410 may run along the entire length or a portion of the length of leg 406A and 406B.

In an embodiment, tape 412 may be wrapped around collection platform 404 in the same way as in microscopic collection devices 200 and 300, as shown in cross section view 414. For example, an operator may insert one edge of tape 412 into slit 408 beginning at the microscopic sample collection side of collection platform 404 and wrap tape 412 around legs 406A and 406B, such that tape 412 ends on the surface of collection platform 404 that faces away from the target surface.

In an embodiment, each grove 410 facilitates removal of tape 412 from collection platform 404. In a further embodiment, grove 410 limits tape 412 that is collected and analyzed to a section of tape 412 that came into contact with the target surface. For example, once an operator collects a microscopic sample from the target surface, the operator guides a scalpel along the formed insides of groves 410 and cuts tape 412. The scalpel cuts a portion of tape 412 that comes into contact with the target surface from the rest of tape 412. For example, the operator cuts away a portion of tape that faces arrows 416. An operator than analyses portion of tape 412 that came into contact with the target surface in the reaction tube and discards the rest of tape 412.

Figure 5:
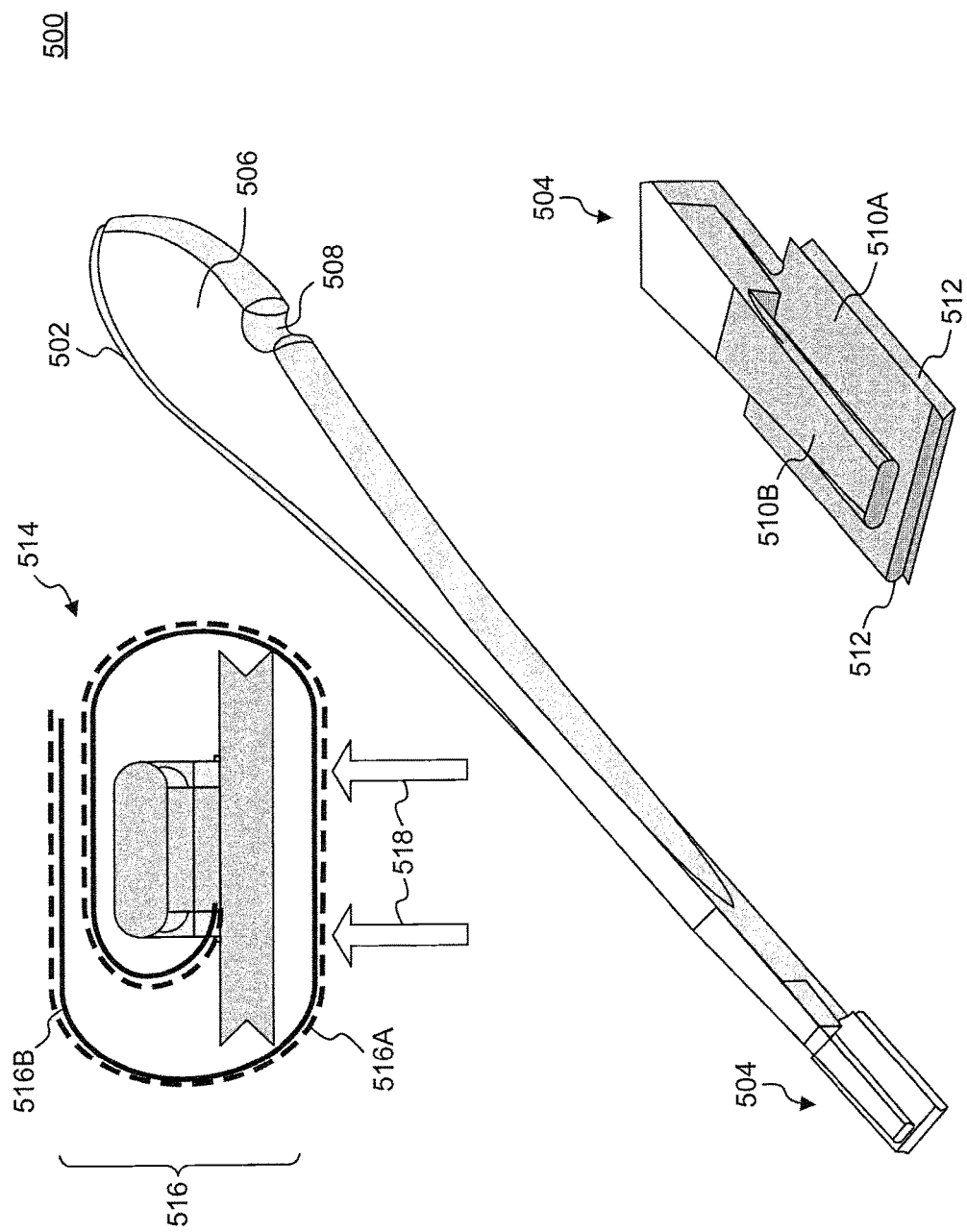
FIG. 5 is a block diagram of a microscopic collection device, according to an embodiment.

FIG. 5 is a block diagram of a microscopic collection device 500, according to an embodiment. Microscopic collection device 500 collects microscopic samples deposited on a target surface. Microscopic collection device 500 includes a holding element 502 on one side and a collection platform 504 on the other side that may be fused together. Collection platform 504 is also shown separately in FIG. 5. In a further embodiment, microscopic collection device 500 may be 197.3 mm in length.

In an embodiment, holding element 502 may include a handhold 506. Handhold 506 facilitates an operator to hold and manipulate microscopic collection device 500 during microscopic sample collection. In a further embodiment, handhold 506 may be round, flat, shaped like a spatula, or have an ergonomic shape that facilitates operator's grip and balances microscopic collection device 500.

In an even further embodiment, handhold 506 may include a grove 508. The grove 508 may be located on either side or both sides (not shown) of handhold 506 and, in combination with a work stand described below, allows the operator to attach and detach tape to/from collection platform 504.

In an embodiment, collection platform 504 is a rectangular collection platform that includes at least two rectangular platforms. For example, collection platform 504 may be divided into platforms 510A and 510B. Platform 510A is rectangular shaped and is used to collect a microscopic sample from the target surface. Platform 510B is parallel and is positioned on top of platform 510A with a horizontal slit dividing platforms 510A and 510B. In an embodiment, platform 510B is also a rectangular platform. In a further embodiment, the length of platforms 510A and 510B is the same or approximately the same, while the width of platform 510B is smaller than the width of platform 510A. In a further embodiment, platforms 510A and 510B are fused to holding element 502.

In an embodiment, collection platform 504 may have length×width×height dimensions of 10 mm×19.5 mm×3.9 mm. Additionally, in an embodiment, the surface area of platform 510A that comes into contact with the target surface is approximately 20.00 mm$^2$. In a further embodiment, height of 3.9 mm includes the height of platforms 510A and 510B and the slit that divides platforms 510A and 510B. For example, the height of platform 510A and 510B may each be 1.3 mm and the height of the horizontal gap between platform 510A and platform 510B may also be 1.3 mm.

In a further embodiment, platform 510A includes groves 512. Groves 512 are positioned along the length of platform 510 and are similar to groves 410 described above. Groves 512 are used to cut away a portion of tape 516 used for microscopic sample collection, and as a result minimize excess tape 516 during the microscopic sample analysis.

In an embodiment, tape 516 is wrapped around collection platform 504 as shown in cross section area 514. For example, an operator may insert one edge of tape 516 between platforms 510A and 510B, and then continue to wrap tape 516 around the top of platform 510B and then around the bottom of platform 510A, and finish on top of platform 510B. In an embodiment, tape 516 includes an adhesive side 516A and a non-adhesive side 516B, and is wrapped around collection platform 504, such that adhesive side 516A faces the target surface. For example, arrows 518 show a microscopic sample collection side of collection platform 504 with tape 516 wrapped around collection platform 504.

Figure 6:
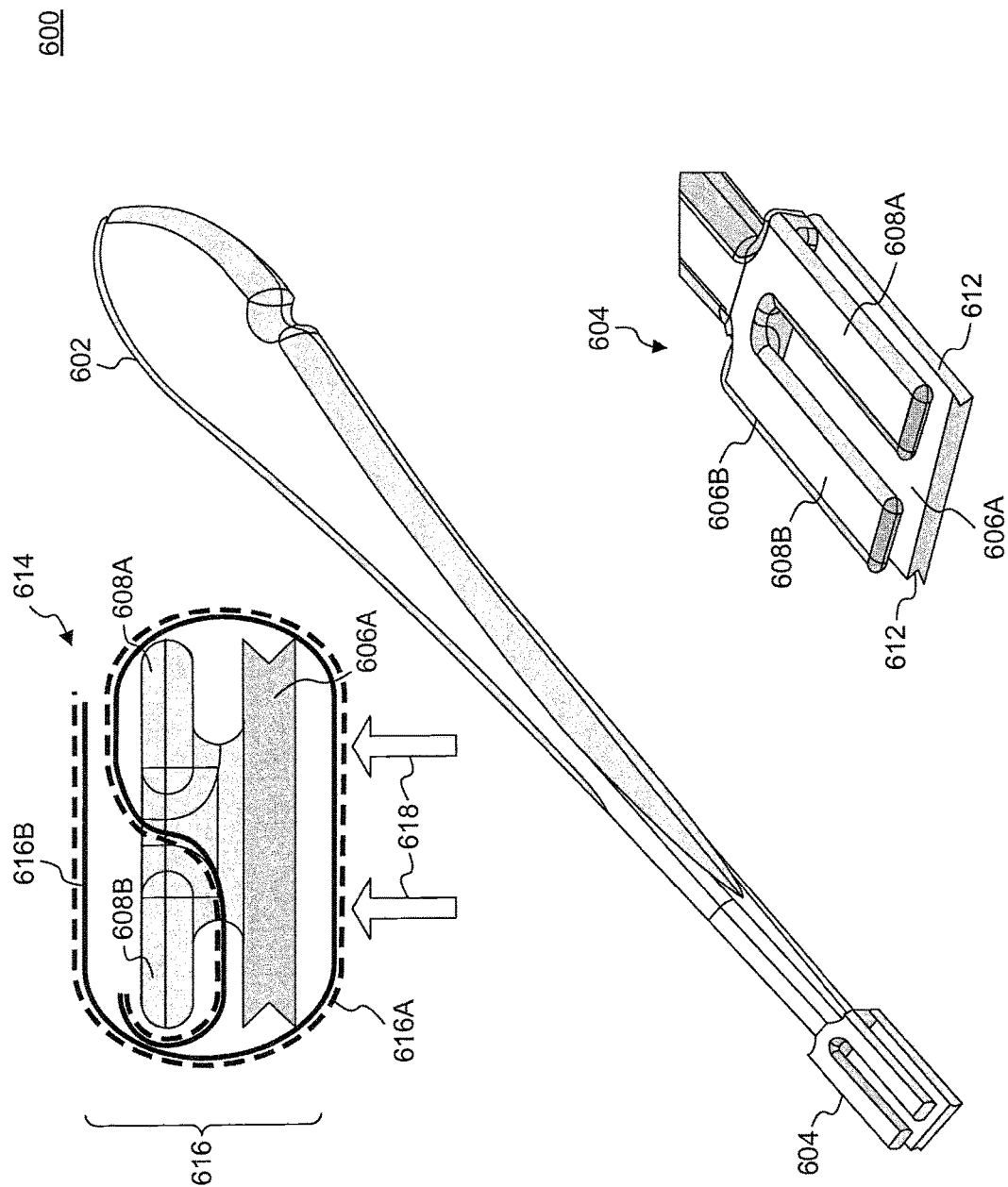
FIG. 6 is a block diagram of a microscopic collection device, according to an embodiment.

FIG. 6 is a block diagram of a microscopic collection device 600, according to an embodiment. Microscopic collection device 600 collects microscopic samples deposited on a target surface. Microscopic collection device 600 includes a holding element 602 that is similar to holding element 502. Microscopic collection device 600 also includes a collection platform 604, shown separately in FIG. 6. Collection platform 604 includes two platforms 606A and 606B. Platform 606A is similar to platform 510A described above, and is used to collect a microscopic sample from the target surface. Platform 606B is parallel and is positioned on top of platform 606A with a horizontal slit dividing platforms 606A and 606B. In an embodiment, platforms 606A and 606B may be fused together and may also be fused to holding element 602.

In an embodiment, platform 606B also has a vertical slit that divides platform 606B into two legs 608A and 608B, such that platform 606B is U shaped and such that legs 608A and 608B come together towards the end of platform 606B that is fused to holding element 602. In an embodiment, the length of platforms 606A and each of legs 608A-B is the same or approximately the same. The vertical slit between legs 608A-B may be approximately 2.00 mm in one embodiment, but may also vary according to different implementations of microscopic collection device 600. Generally, the vertical slit between legs 608A and 608B may be wide enough for microscopic tape to pass between legs 608A and 608B, and facilitates the operator in attaching the tape to collection platform 604.

In a further embodiment, collection platform 604 may have length×width×height dimensions of 10 mm×19.5 mm×3.9 mm, such that the surface area of platform 606A that comes into contact with the target surface is approximately 20.00 mm$^2$. In a further embodiment, height of 3.9 mm includes the height of platforms 606A and 606B and the slit that divides platforms 606A-B. For example, the height of platform 606A and 606B may each be 1.3 mm and the height of the horizontal slit between platform 606A and platform 606B may also be 1.3 mm.

In a further embodiment, platform 606A includes groves 612. Groves 612 are positioned along the length of platform 606A and are similar to groves 410 described above. Groves 612 are used to cut away a portion of tape 612 that was used for microscopic sample collection, and as a result minimize the excess tape 612 used during the microscopic sample analysis.

In an embodiment, tape 616 is wrapped around collection platform 604 as shown in cross section area 614. For example, an operator may begin with the first edge of tape 616 being on the outside of leg 608B and then sliding tape 616 under and along the bottom surface of leg 608B. Then the operator may slide tape 616 through the vertical slit between legs 608A and 608B and continue over the top of leg 608A. Then the operator may continue along the outside edge of leg 608A and around the bottom surface of platform 606A, finishing at the top of leg 608B or the top of leg 608A.

In an embodiment, tape 616 includes an adhesive side 616A and a non-adhesive side 616B, and is wrapped around collection platform 604, such that adhesive side 616A faces the target surface. For example, arrows 618 point to the microscopic sample collection side of collection platform 604 with tape 616 wrapped around collection platform 604.

FIGS. 7-11 are block diagrams of microscopic collection devices 700-1100 that are similar to the microscopic collection devices 200-600, according to an embodiment. However, in microscopic collection devices 700-1100 holding element and a collection platform may fused at an angle, such as, but not limited to a 30° angle, whereas in microscopic collection devices 200-600 holding element and a collection platform are in parallel. In other embodiments, the angle may be a 45° or a 60° angle, or another angle suitable for microscopic sample collection.

Figure 7:
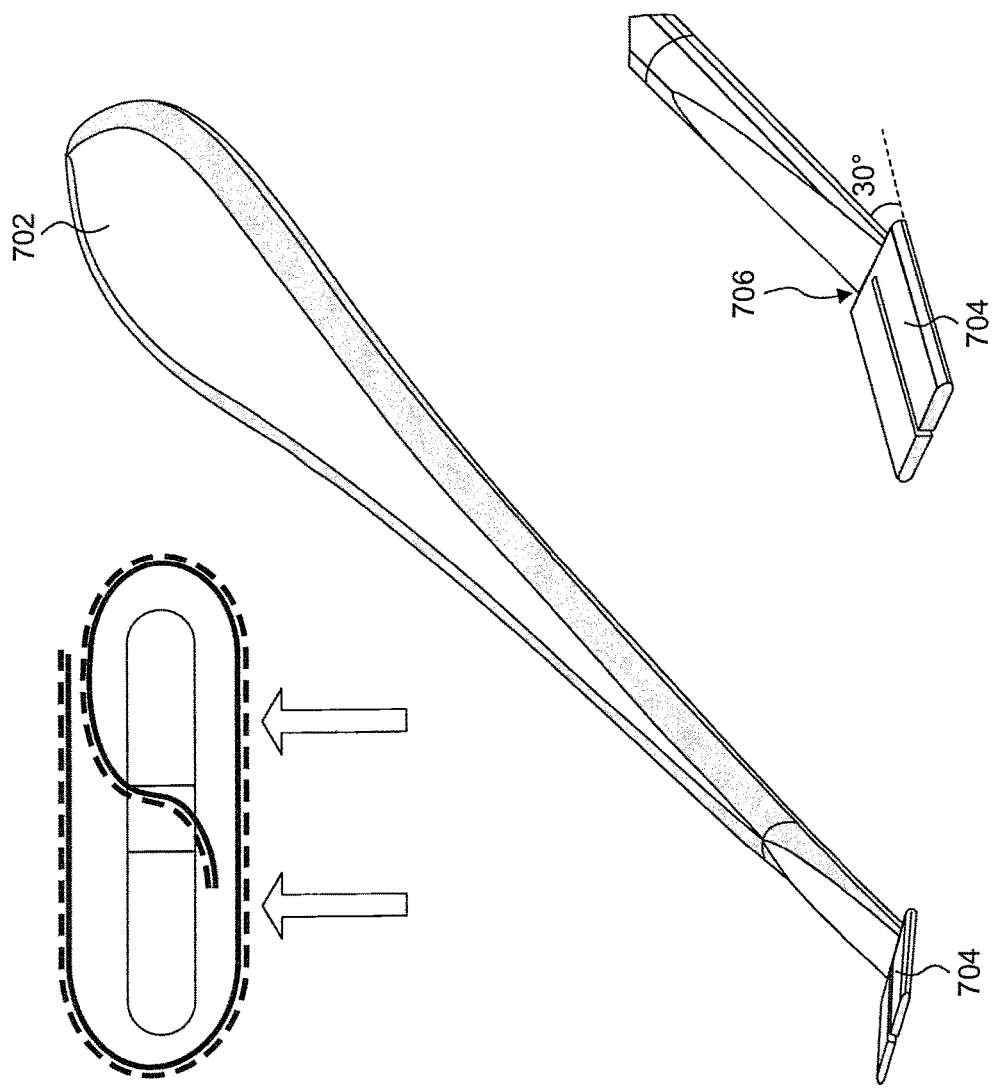
FIG. 7 is a block diagram of a microscopic collection device, according to an embodiment.
Figure 8:
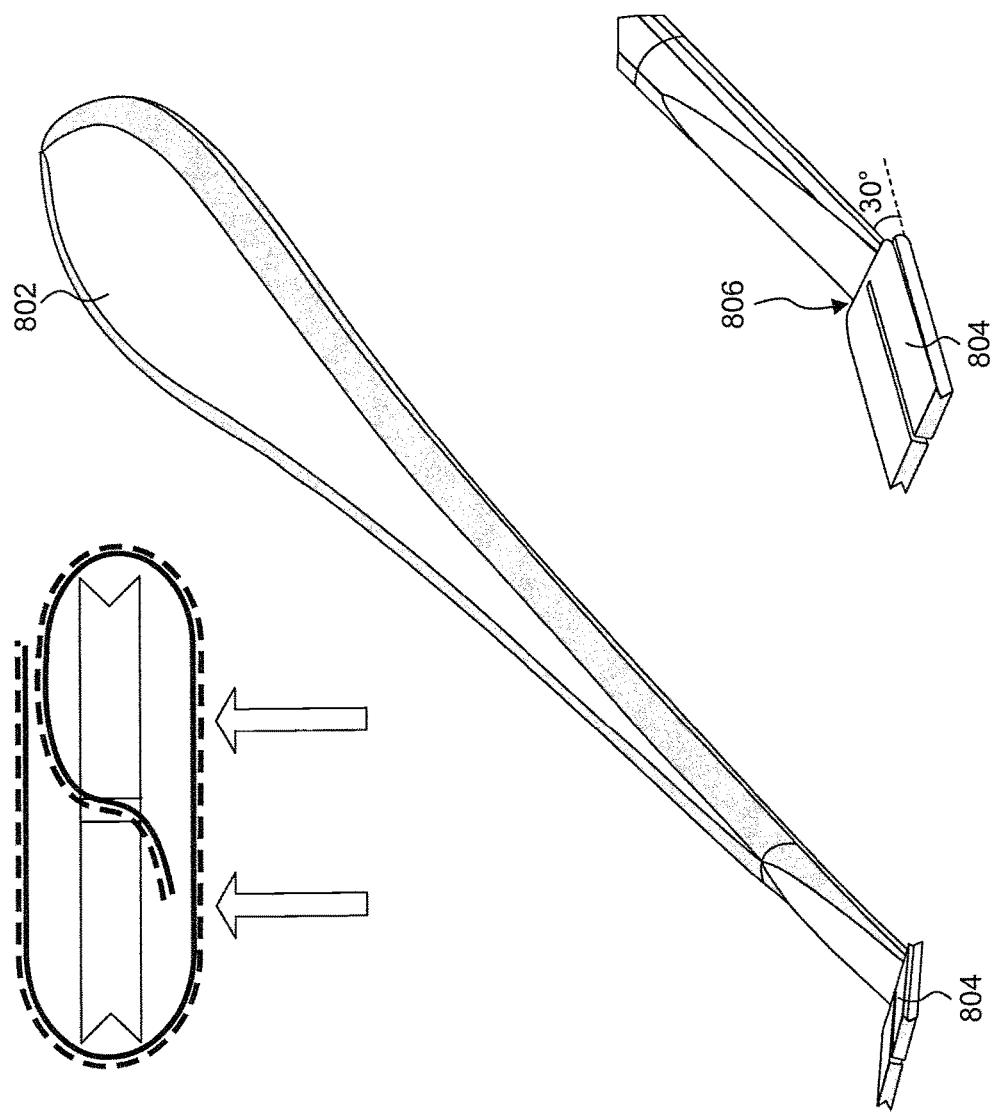
FIG. 8 is a block diagram of a microscopic collection device, according to an embodiment.
Figure 9:
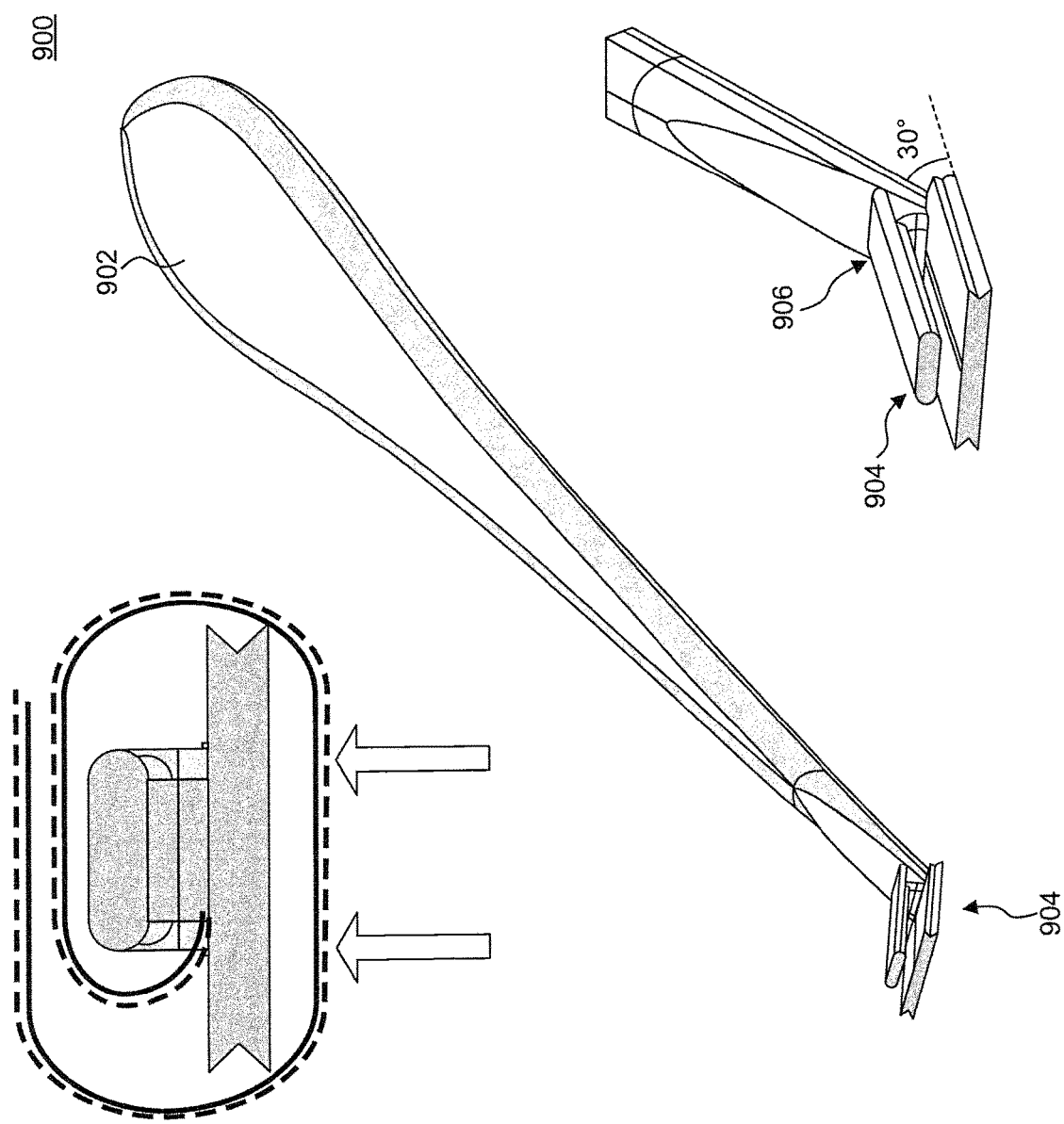
FIG. 9 is a block diagram of a microscopic collection device, according to an embodiment.
Figure 10:
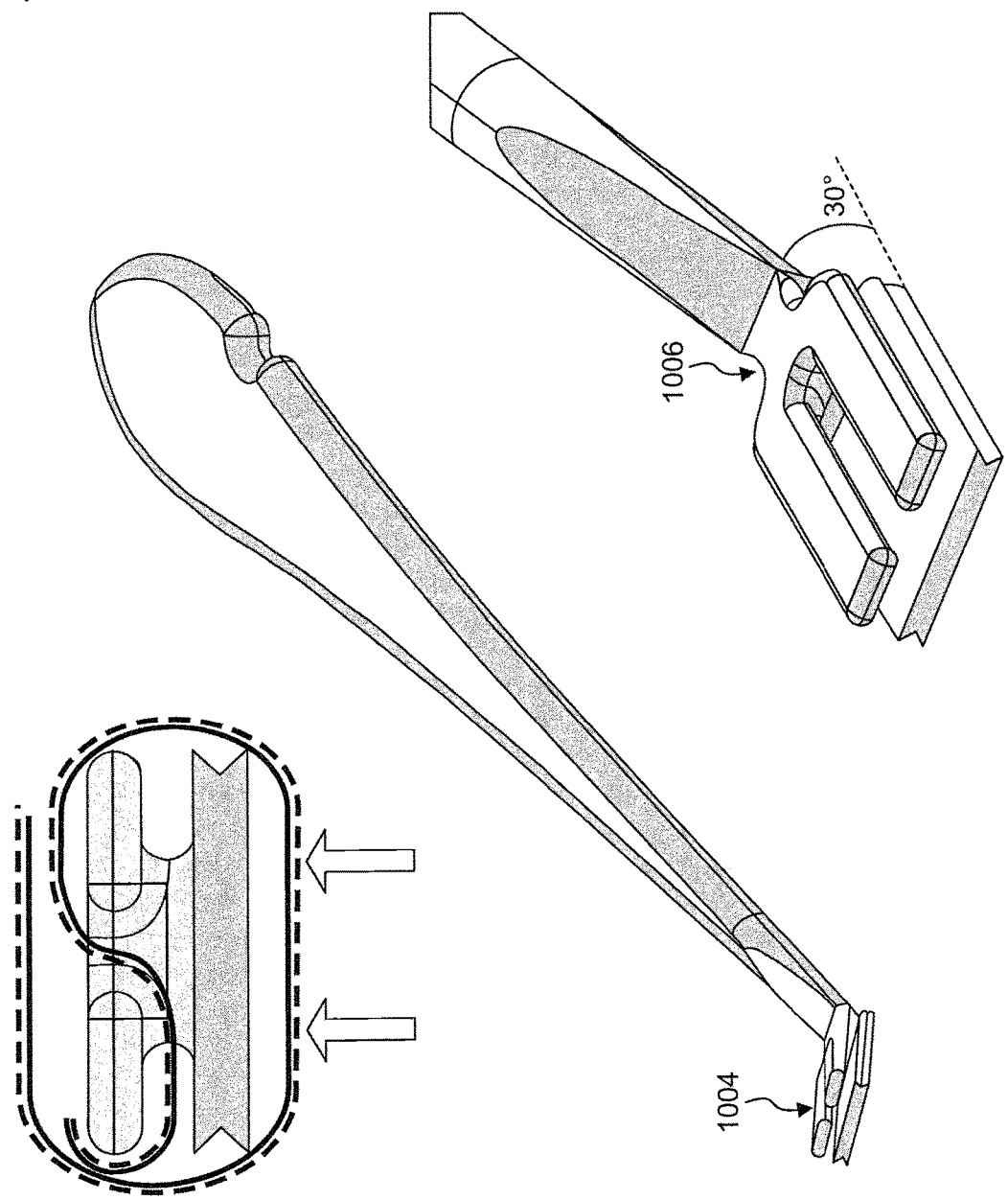
FIG. 10 is a block diagram of a microscopic collection device, according to an embodiment.
Figure 11:
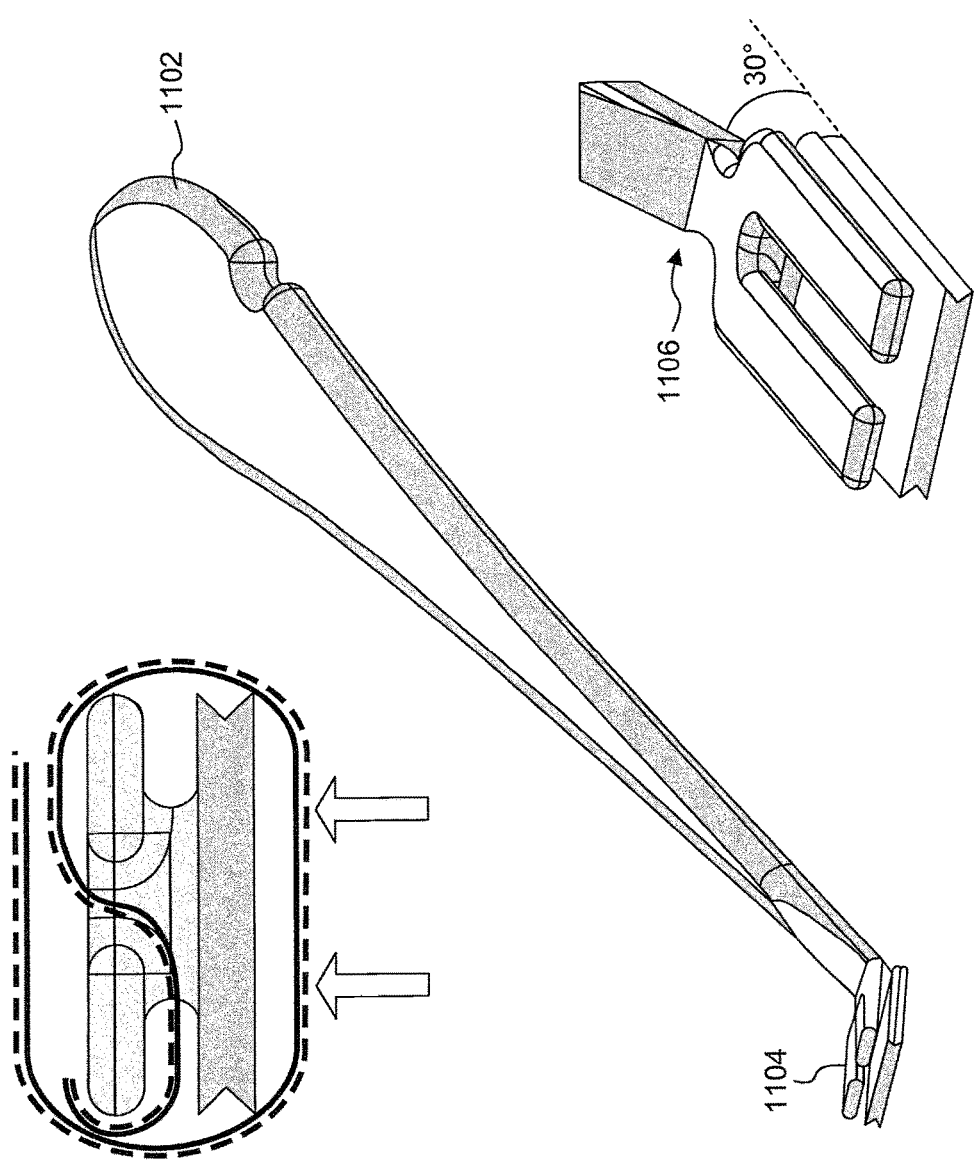
FIG. 11 is a block diagram of a microscopic collection device, according to an embodiment.

For example, microscopic collection device 700 includes a holding element 702 and a collection platform 704 that are similar to holding element 202 and a collection platform 204. As in microscopic collection device 200, holding element 702 and collection platform 704 are fused together. In a non-limiting embodiment, holding element 702 and collection platform 704 are fused at an approximately 30° angle at location 706 as shown in FIG. 7. That is, when collection platform 704 faces the target surface, there is an approximately 30° angle between holding element 702 and the target surface.

In an embodiment, the 30° angle (or potentially another angle) between holding element 702 and collection platform 704 allows an operator to comfortably position microscopic collection device 700 against the target surface, when the target surface is a flat, open, surface, such as a floor or a table top. In an embodiment, the angle prevents holding element 702 from touching the target surface containing the microscopic sample and reduces inadvertent contamination.

In an embodiment, microscopic collection devices 800-1100 which are similar to the respective microscopic collection devices 300-600, also include an angle between the respective holding elements 802-1102 and collection platforms 804-1104 at locations 806-1106.

Figure 12:
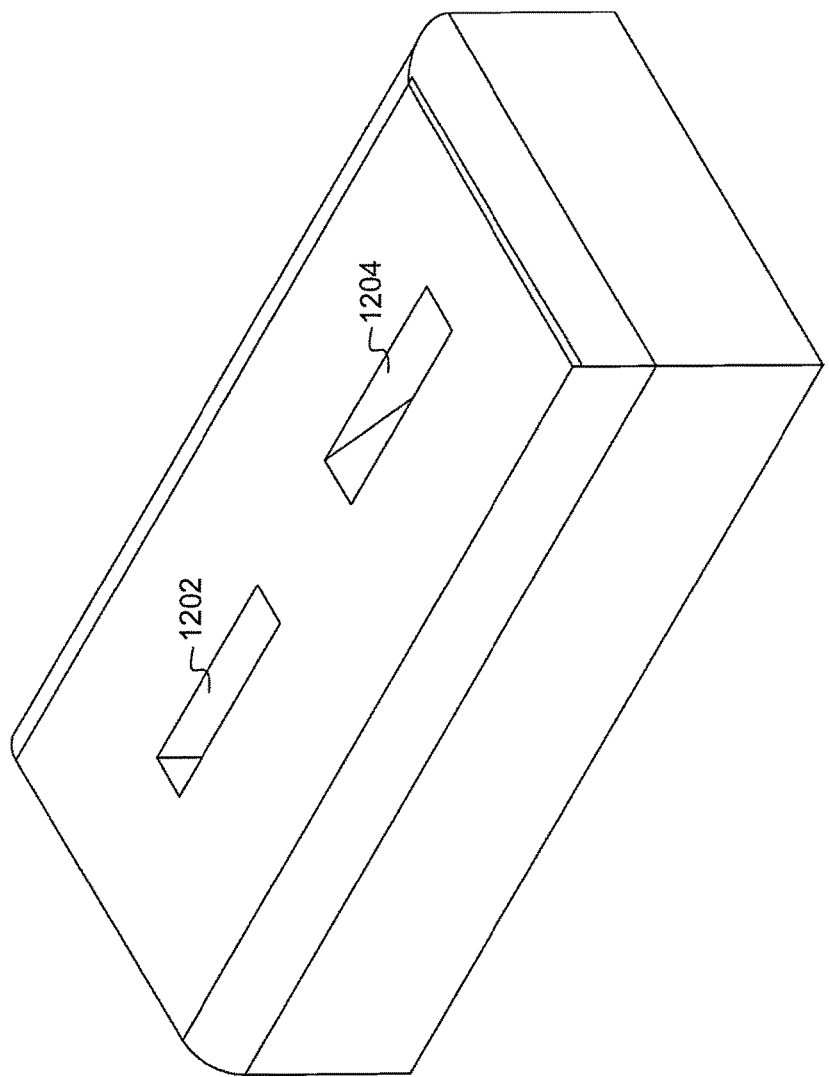
FIG. 12 is a block diagram of a work stand, according to an embodiment.

FIG. 12 is a block diagram of a work stand 1200, according to an embodiment. Work stand 1200 is operable to hold microscopic collection devices 100-1100 while tape is loaded onto microscopic collection devices 100-1100 in preparation for microscopic sample collection. In an embodiment, work stand 1200 may be shaped like a rectangular prism and is placed on a flat surface, such as a table. In a further embodiment, the length×width×height dimensions of work stand 1200 may be 100 mm×50 mm×25 mm, such that the dimensions of the top and bottom surfaces of work stand 1200 are 100 mm×50 mm, and dimensions of each of the two parallel sides of work stand 1200 are 50 mm×20 mm and 100 mm×20 mm.

In an embodiment, work stand 1200 includes two slots on the top surface, slot 1202 and slot 1204. Slots 1202 and 1204 are positioned next to each other and parallel to the long side of work stand 1200, in one embodiment. Slots 1202 and 1204 are capable of holding the holding elements of microscopic collection devices 100-1100. For example, slot 1202 is capable of holding the end of holding elements 102-602, such that collection platforms 104-604 are perpendicular to work stand 1200. In an embodiment, slot 1202 is formed downward and toward the center of work stand 1200.

In another example, slot 1204 is capable of holding elements 702-1102, such that collection platforms 704-1104 are perpendicular to the top surface of work stand 1200. In order for collection platforms 704-1104 to be perpendicular to the top surface of work stand 1200, slot 1204 is slanted downward at a 30° angle, or another angle. In an embodiment, the angle of slot 1204 is the same or about the same as the angle between a collection platform and a holding element of microscopic collection devices 700-1100.

Figure 13:
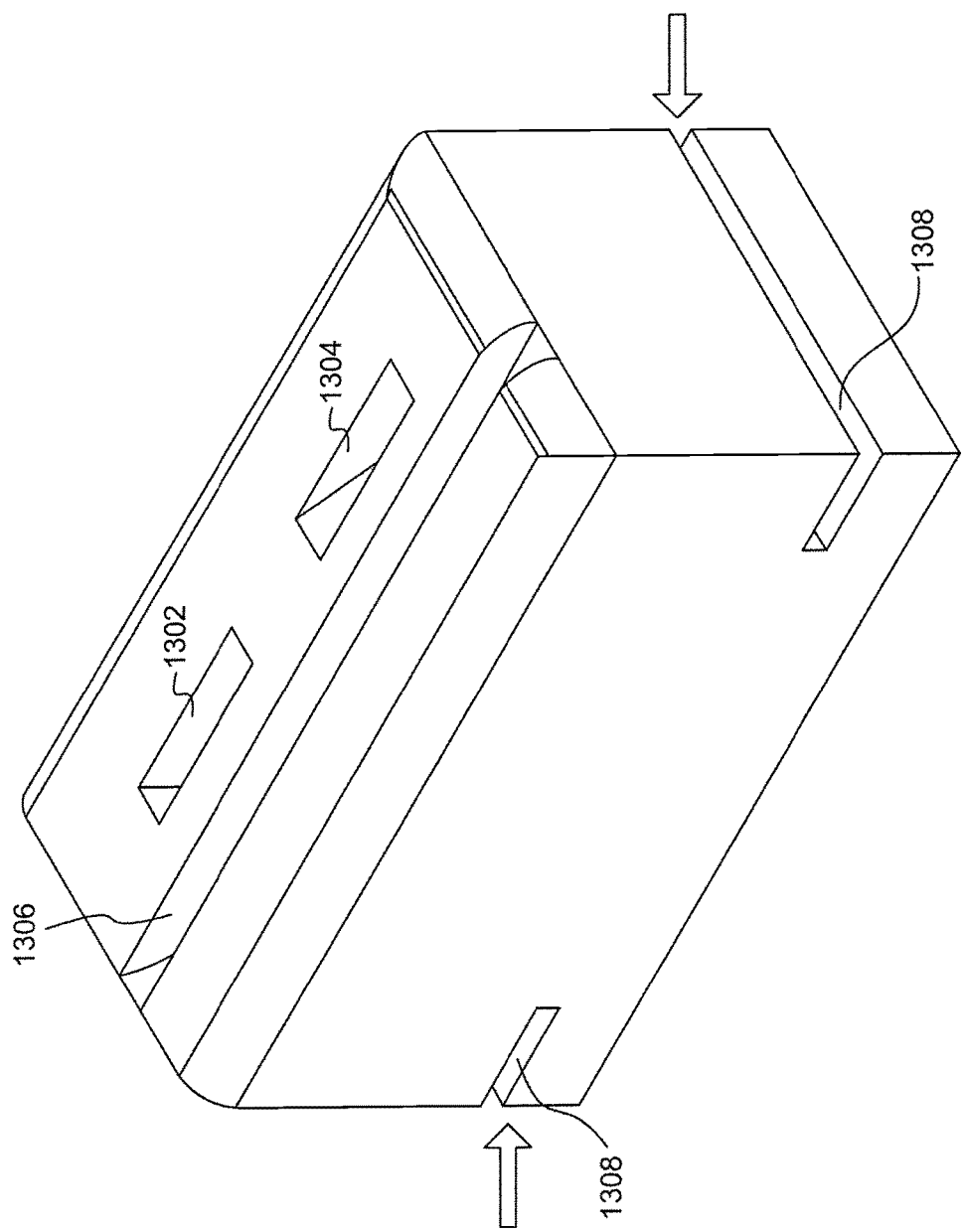
FIG. 13 is a block diagram of a work stand, according to an embodiment.

FIG. 13 is a block diagram of a work stand 1300, according to an embodiment. Work stand 1300 is capable of holding microscopic collection devices 100-1100 while tape is loaded onto microscopic collection devices 100-1100 in preparation for microscopic sample collection. In an embodiment, work stand 1300 may be shaped like a rectangular prism and is placed on a flat surface, such as a table. In a further embodiment, the length×width×height coordinates of work stand 1300 may be 100 mm×50 mm×50 mm, such that the dimensions of the top and bottom surfaces of work stand 1200 are 100 mm×50 mm, and dimensions of each of the two parallel sides of work stand 1300 are 50 mm×50 mm and 10 mm×50 mm.

In an embodiment, work stand 1300 includes three slots on the top surface, slot 1302, slot 1304, and slot 1306. Slots 1302 and 1304 are similar to slots 1202 and 1204 that are included in work stand 1200.

In an embodiment, slot 1306 also holds microscopic collection devices 100-1100. Slot 1306 is formed on the top surface and is parallel to slots 1302 and 1304 and parallel to the length of the top surface. In an embodiment, slot 1306 is capable of holding a microscopic collection device on its side, such that the side of a holding element is inserted into slot 1306 and the microscopic collection device is positioned parallel to the top surface of work stand 1302. A microscopic collection device may be placed into slot 1306 for tape loading.

In an embodiment, work stand 1300 also includes slots 1308. Slots 1308 are formed into the sides of work stand 1300, such that slots 1308 are perpendicular to slot 1306 and parallel to the surface onto which an operator places work stand 1300. In an embodiment, slots 1308 are formed toward the bottom of the sides of work stand 1300 that are 50 mm×50 mm.

In an embodiment, slots 1308 provide additional support for immobilizing the microscopic collection device when the microscopic collection device is inserted into slot 1306. For example, rubber bands or another type of bands may be inserted into one or both slots 1308 and wrapped around the microscopic collection device that is inserted into slot 1306.

In a further embodiment, a microscopic collection device, such as microscopic collection device 500, includes grove 508. For microscopic collection devices that include a grove, a rubber band may be inserted into slot 1306 and also into the grove, such as grove 508 to further immobilize a microscopic collection device when the tape is attached to the collection platform.

Figure 14:
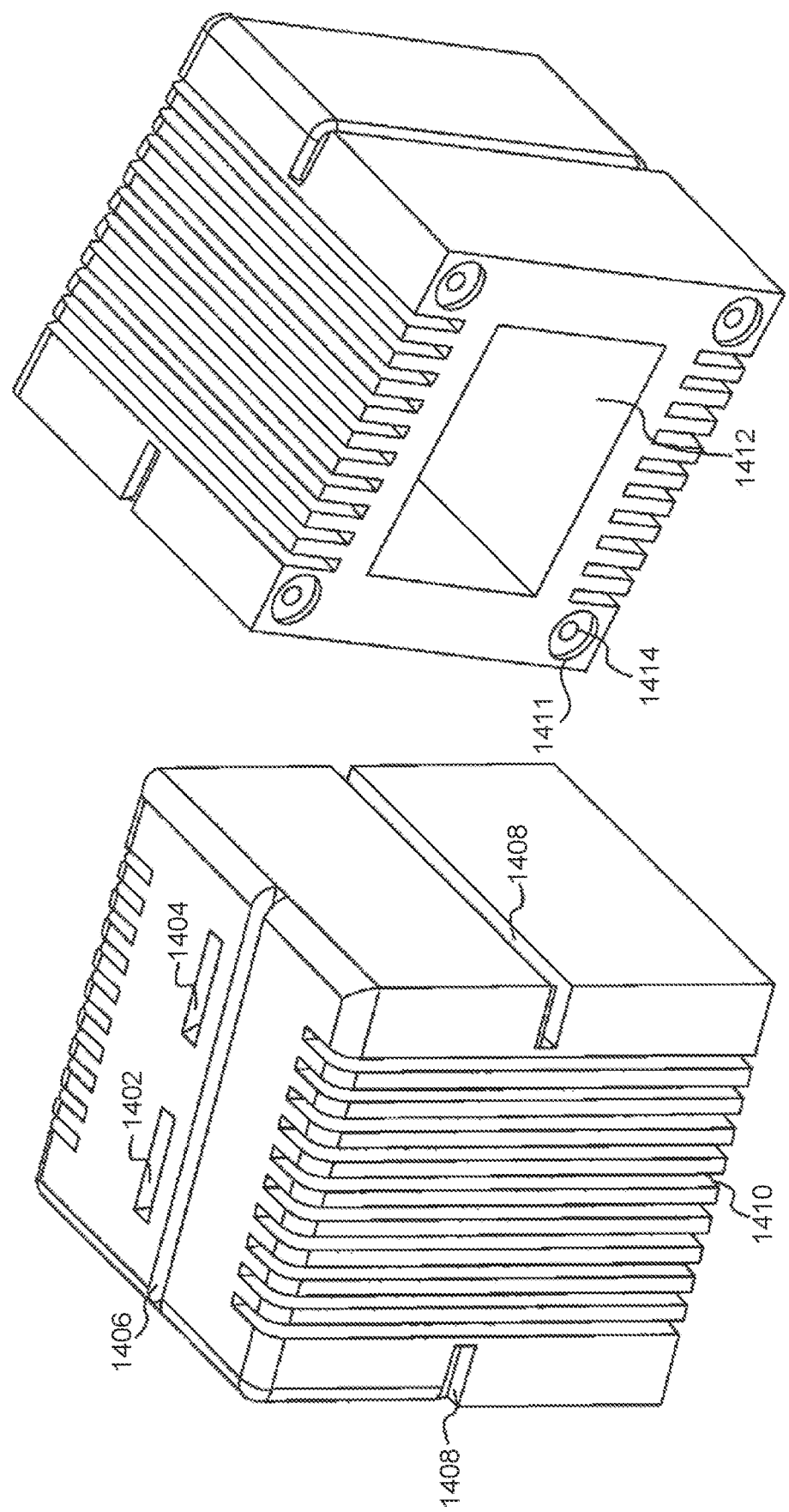
FIG. 14 is a block diagram of a work stand, according to an embodiment.

FIG. 14 is a block diagram of a work stand 1400, according to an embodiment. Work stand 1400 includes the features of work stand 1300, such as slots 1402, 1404, 1406 and 1408. Additionally, work stand 1400 is shaped as a cube, having exemplary length×width×height dimensions of 100 mm×100 mm×100 mm. In a non-limiting embodiment, slots 1408 may be half way down the sides of work stand 1400.

Work stand 1400 also has one or more slits 1410. Slits 1410 are vertical slits that begin at the base of work stand 1400 and run vertically along the parallel sides of work stand 1400 (that do not include slots 1408) to the top surface of work stand 1400. In an embodiment, slits 1410 allow rapid heat dissipation during sterilization processes, such as sterilization by autoclaving. In an embodiment, work stand 1400 may also have a hollowed base 1414 that further aids heat dissipation during the sterilization process.

In an embodiment, work stand 1400 may have one or more threaded holes, such as hole 1411. Hole 1414 may be round and located in a corner of hollowed base 1412 of work stand 1400, as shown in FIG. 14. In a further embodiment, there may be a hole 1414 in each corner of the base.

In an embodiment, the operator may use the thread in hold 1414 to screen in a rubber foot (not shown) into each hole 1414. The rubber feet stabilize work stand 1400 when an operator attaches and detaches the microscopic tape from microscopic collection devices 100-1100 that are inserted into slots 1402, 1404, and 1406. In a further embodiment, the rubber feet may be removed from work stand 1400 before the sterilization process.

In an embodiment, microscopic collection devices 100-1100 and work stands 1200-1400 may be printed using different metals or polymers. For example, microscopic collection devices 100-1100 and work stands 1200-1400 may be printed using plastic or aluminum materials. In an embodiment, microscopic collection devices 100-1100 and work stands 1200-1400 may be printed using metals and/or plastics that may be sterilized, such as being flame sterilized prior to microscopic collection to impede contamination of the microscopic sample.

It is to be appreciated that the Detailed Description section, and not the Summary and Abstract sections (if any), is intended to be used to interpret the claims. The Summary and Abstract sections (if any) may set forth one or more but not all exemplary embodiments as contemplated by the inventor(s), and thus, are not intended to limit the embodiments or the appended claims in any way.

While the embodiments have been described herein with reference to exemplary embodiments for exemplary fields and applications, it should be understood that the embodiments are not limited thereto. Other embodiments and modifications thereto are possible. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the embodiments should not be limited by any of the above-described exemplary embodiments, but should be defined only in accordance with the following claims and their equivalents.

What is claimed is:

1. A work stand, comprising:
a first slit formed on a horizontal top surface of the work stand, the first slit comprising a first slot formed vertically downward at a first angle toward a center of the work stand and configured to hold a first microscopic collection device comprising a first holding element and a first collection platform, wherein the first collection platform of the first microscopic collection device is perpendicular to the horizontal top surface; and
a second slit formed on the horizontal top surface of the work stand, the second slit comprising a second slot that is slanted vertically downward at a second, angle into the work stand, wherein second angle of the second slot is different from the first angle of the first slot, the second slot is configured to hold a second microscopic collection device comprising a second collection platform and a second holding element at the angle to the second collection platform, wherein the second collection platform of the second microscopic collection device is perpendicular to the horizontal top surface of the work stand.

2. The work stand of claim 1, wherein the second slot is formed at an angle that is approximately the same as the angle between the second collection platform and the second holding element.

3. The work stand of claim 1, wherein the angle of the second slot is approximately 30°.

4. The work stand of claim 1, further comprising:
a third slit formed on the top surface of the work stand and capable of holding the first microscopic collection device or the second microscopic collection device by inserting a side of the first holding element or the second holding element into the third slit;
a fourth slit formed on a first side surface of the work stand and perpendicular to the third slit; and
a fifth slit formed on a second side surface of the work stand and perpendicular to the third slit, wherein the fourth slit and the fifth slit are capable of immobilizing the first microscopic collection device or the second microscopic collection device.

5. The work stand of claim 1, further comprising material capable of being flame sterilized.

6. A work stand, comprising:
a base shaped in a rectangular prism that is shaped to sit on a flat surface, wherein the base comprises three slots on a top surface, wherein:
a first slot formed vertically downward at a first angle toward a center of the work stand and that is configured to hold a microscopic collection device comprising a first holding element and a first collection platform, wherein the first collection platform of the microscopic collection device is perpendicular to the top surface; and
the first slot is parallel to a second slot that is slanted vertically downward a second angle into the work stand and parallel to a length of the top surface, wherein second angle of the second slot is different from the first angle of the first slot, and wherein the second slot is configured to hold the microscopic collection device on its side when inserted.

7. The work stand of claim 6, wherein the microscopic collection device, when inserted into the second slot, is positioned parallel to the top surface.

8. The work stand of claim 6, further comprising two slots that are formed into sides of the work stand and perpendicular to the first slot.

9. The work stand of claim 8, wherein the two slots that are formed into the sides are configured to hold a band element wrapped around the microscopic collection device.

10. A work stand shaped in a cube configured to hold a plurality of microscopic collection devices, comprising:
   a first slit formed on a horizontal top surface of the work stand, the first slit comprising a first slot formed vertically downward at a first angle toward a center of the work stand and configured to hold a first microscopic collection device comprising a first collection platform, wherein the first collection platform of the first microscopic collection device is perpendicular to the horizontal top surface;
   a second slit formed on the horizontal top surface of the work stand, the second slit comprising a second slot that is slanted vertically downward at a second angle into the work stand, wherein second angle of the second slot is different from the first angle of the first slot, wherein the second slot is configured to hold a second microscopic collection device comprising a second collection platform and a second holding element at the angle to the second collection platform, wherein the second collection platform of the second microscopic collection device is perpendicular to the horizontal top surface; and
   two slots that are formed into sides of the work stand and perpendicular to the first slit.

11. The work stand of claim 10, further comprising:
   a plurality of vertical slits that begin at a base of the work stand and run vertically along parallel sides of the work stand, wherein the vertical slits enable heat dissipation during a sterilization process.

12. The work stand of claim 11, wherein the base is hollowed.

13. The work stand of claim 12, further comprising:
   a plurality of threaded holes located in the hollowed base.

14. The work stand of claim 6, wherein the first slot and the second slot are both formed downward at different angles.

15. The work stand of claim 10, wherein the first slot and the second slot are both formed downward at different angles.

16. The work stand of claim 1, wherein the work stand includes horizontal slots on two sides of the work stand, where each of the horizontal slots is configured to hold a rubber band that immobilizes the microscopic collection device, wherein the rubber band is inserted into both one of the horizontal slots and a groove on the microscopic collection device.

17. The work stand of claim 6, wherein the work stand includes horizontal slots on two sides of the work stand, where each of the horizontal slots is configured to hold a rubber band that immobilizes the microscopic collection device, wherein the rubber band is inserted into both one of the horizontal slots and a groove on the microscopic collection device.

18. The work stand of claim 10, wherein the work stand includes horizontal slots on two sides of the work stand, where each of the horizontal slots is configured to hold a rubber band that immobilizes the microscopic collection device, wherein the rubber band is inserted into both one of the horizontal slots and a groove on the microscopic collection device.

19. The work stand of claim 13, wherein at least one of the plurality of threaded holes is configured to hold a rubber foot to stabilize the work stand.

20. The work stand of claim 1, wherein the first slot at the first angle is perpendicular to the horizontal top surface.

* * * * *